United States Patent [19]
Uesugi

[11] Patent Number: 5,475,855
[45] Date of Patent: Dec. 12, 1995

[54] PIPELINED COMPUTER WITH HALF MACHINE CYCLE ALTERNATING WRITE CONTROL FOR AVOIDING USAGE CONFLICTS IN GENERAL REGISTERS

[75] Inventor: Takahiko Uesugi, Yamanashi, Japan

[73] Assignee: NEC Corporation, Tokyo, Japan

[21] Appl. No.: 238,340

[22] Filed: May 5, 1994

Related U.S. Application Data

[63] Continuation of Ser. No. 130,535, Oct. 1, 1993, abandoned, which is a continuation of Ser. No. 633,531, Dec. 27, 1990, abandoned.

[30] Foreign Application Priority Data

Dec. 28, 1989 [JP] Japan ..................... 1-338594

[51] Int. Cl.$^6$ ..................................................... G06F 9/38
[52] U.S. Cl. ..................... 395/800; 364/DIG. 1; 364/DIG. 2; 364/231.8; 364/270; 364/270.4; 364/270.5; 364/271; 364/271.6
[58] Field of Search ................ 364/DIG. 1 MS File, 364/DIG. 2 MS File; 395/375, 500, 550, 800

[56] References Cited

U.S. PATENT DOCUMENTS

| | | | |
|---|---|---|---|
| 4,639,866 | 1/1987 | Loo | 395/550 |
| 4,745,302 | 5/1988 | Hanawa et al. | 307/269 |
| 5,001,626 | 3/1991 | Kashiyama et al. | 395/800 |
| 5,023,828 | 6/1991 | Grundmann et al. | 364/900 |
| 5,115,393 | 5/1992 | Kashiyama et al. | 395/425 |
| 5,167,025 | 11/1992 | Kusakabe | 395/550 |

Primary Examiner—Robert B. Harrell
Attorney, Agent, or Firm—Foley & Lardner

[57] ABSTRACT

In a data processing system, arithmetic/logic units, each with a different number stages, are pipelined for executing arithmetic/logic instructions stored in main memory in full machine cycles. One of the outputs of the arithmetic/logic units is selected. In response to a memory access instruction, data is fetched from the main memory and stored into general registers in which the results of instruction execution from the arithmetic/logic units are also stored. A selector has a first input terminal which receives the selected output of the arithmetic/logic units, a second input terminal for receiving the fetched data, and an output terminal coupled to the general registers. In response to half machine clock pulses, the selector alternately establishes a first path between the first input terminal and the output terminal and a second path between the second input terminal and the output terminal during mutually exclusive times of half machine cycle.

5 Claims, 4 Drawing Sheets

FIG. 3A PRIOR ART

| MACHINE CYCLE NO. | 1 | 2 | 3 | 4 | 5 | 6 | 7 | 8 | 9 | 10 | 11 |
|---|---|---|---|---|---|---|---|---|---|---|---|
| #1  R3 ← R1 × R2 | ST | | | | | | | W | | | |
| #2  R6 ← R4 × R5 | | ST | | | | | | | W | | |
| #3  R9 ← R7 & R8 | | | ST | | W | | | | | | |
| #4  R10 ← M (100) | | | | ⁅30⁆ | | ST | 32 | ⁅31⁆ | | W | |
| #5  R13 ← R11 & R12 | | | | | | | | | ST | | W |

FIG. 3B

| MACHINE CYCLE NO. | 1 | 2 | 3 | 4 | 5 | 6 | 7 | 8 | 9 |
|---|---|---|---|---|---|---|---|---|---|
| #1  R3 ← R1 × R2 | ST | | | | | | | W | |
| #2  R6 ← R4 × R5 | | ST | | | | | | | W |
| #3  R9 ← R7 & R8 | | | ST | | W | | | | |
| #4  R10 ← M (100) | | | | ST | | | W | | |
| #5  R13 ← R11 & R12 | | | | | ST | | | W | |

LEGEND:
ST: START OF EXECUTION
W: WRITE OPERATION

FIG. 4A PRIOR ART

| MACHINE CYCLE NO. | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| #6 | R1 ← M (100) | ST | | | | | | | | | | CK | QUEUE | | W |
| #7 | R4 ← R2 & R3 | | ST | | W | | | | | | | | | | |
| #8 | R7 ← R5 & R6 | | | 34 | ST | 35 | W | | | | | | | | |
| #9 | R10 ← R8 X R9 | | | | | ST | | | | | | | W | | |
| #10 | R13 ← R11 X R12 | | | | | | ST | | | | | | | W | |

FIG. 4B

| MACHINE CYCLE NO. | | 1 | 2 | 3 | 4 | 5 | 6 | 7 | 8 | 9 | 10 | 11 | 12 |
|---|---|---|---|---|---|---|---|---|---|---|---|---|---|
| #6 | R1 ← M (100) | ST | | | | | | | | | | W | |
| #7 | R4 ← R2 & R3 | | ST | | W | | | | | | | | |
| #8 | R7 ← R5 & R6 | | | ST | | W | | | | | | | |
| #9 | R10 ← R8 X R9 | | | | ST | | | | | | | W | |
| #10 | R13 ← R11 X R12 | | | | | ST | | | | | | | W |

LEGEND:
ST: START OF EXECUTION
W: WRITE OPERATION
CK: CONTENTION CHECK
QUEUE: QUEUING IN BUFFER REGISTERS

PIPELINED COMPUTER WITH HALF MACHINE CYCLE ALTERNATING WRITE CONTROL FOR AVOIDING USAGE CONFLICTS IN GENERAL REGISTERS

This application is a continuation of application Ser. No. 08/130,535, filed Oct. 1, 1993, now abandoned, which is a continuation of application Ser. No. 07/633,531, filed Dec. 27, 1990, now abandoned.

BACKGROUND OF THE INVENTION

The present invention relates generally to pipeline computers.

Current high-performance data processing systems are usually equipped with a plurality of pipelined arithmetic and logic functions which are executed in machine cycles. When arithmetic operations of identical type are executed, operands are continuously supplied to a particular arithmetic unit, while at the same time, arithmetic/logic operations of different types may be executed in a parallel mode by different arithmetic/logic units. A memory access controller is provided to fetch data from the main memory in response to a memory access instruction. The results of arithmetic/logic instructions and data from the memory access controller are written into general registers. If no conflict occurs on the write path of the general registers, each instruction can be executed within a machine cycle.

However, such resource-usage conflicts often occur due to different execution times. A contention check circuit is therefore provided for queuing contending requests through buffer registers to avoid resource-usage conflict. The memory access controller is usually provided with a cache memory to enable it to write data into a general register within a specified time interval if a cache memory "hit" occurs if the data to be fetched is found therein. If the data to be found in the cache memory is not present (cache memory miss), it takes much longer than the specified time interval for writing data into general registers. Another contention check circuit is therefore provided to acquire the right to access general registers at the instant a data item is fetched from the main memory. Therefore, the current pipelined data processing system suffers from hardware complexity and reduced throughput.

SUMMARY OF THE INVENTION

It is therefore an object of the present invention to provide a pipelined data processing system having reduced hardware complexity and increased throughput.

Because of the many logic states to be checked before an arithmetic/logic instruction is executed, it takes a substantial amount of time to check for conflict on the arithmetic pipeline. On the other hand, it takes a short period of time for writing data into the general registers since no complex circuitry is involved in determining their write timing. The present invention is based on the recognition of this time difference. The above object is obtained by segmenting the machine cycle into first and second half periods and assigning them separately to contending requests.

According to the present invention, a data processing system which comprises a main memory for storing data and instructions therein and a plurality of arithmetic/logic units respectively having a different number of pipelined stages for executing arithmetic/logic instructions stored in the main memory in full machine cycles. A write controller is provided for selecting one of the outputs of the arithmetic/logic units according to the instructions being executed. A memory access controller responds to a memory access instruction stored in the main memory by fetching data from the main memory. The results of instruction execution from the arithmetic/logic units and data from the memory access controller are stored into general registers and supplied to the arithmetic/logic units and the memory access controller. A clock generator supplies half machine cycle clock pulses to a selector having a first input terminal for receiving the selected output of the arithmetic/logic units, a second input terminal for receiving data from the memory access controller, and an output terminal coupled to the general registers. The selector alternately establishes a first path between the first input terminal end the output terminal and a second path between the second input terminal and the output terminal during mutually exclusive half machine cycle times.

BRIEF DESCRIPTION OF THE DRAWINGS

The present invention will be described in further detail with reference to the accompanying drawings, in which;

FIGS 3A and 3B are timing diagrams for describing the operations of the processing systems of FIGS. 1 and 2, respectively, when a cache memory hit occurs; and FIGS. 4A and 4B are timing diagrams for describing the operations of the processing systems of FIGS. 1 and 2, respectively, when a cache memory miss occurs.

DETAILED DESCRIPTION

Figure 1:
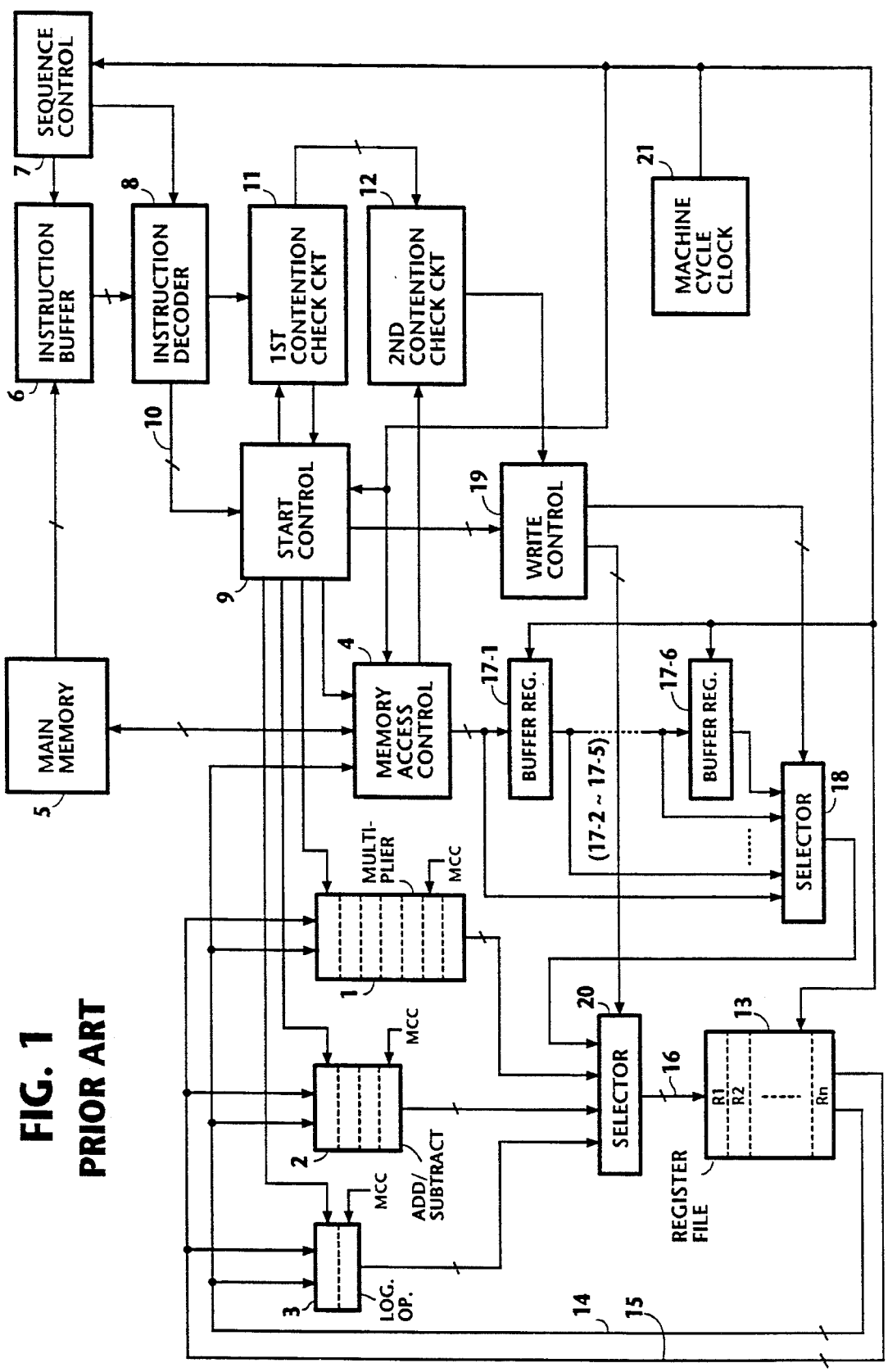
FIG. 1 is a block diagram of a prior art pipeline data processing system.

Before going into the details of the present invention, it is appropriate to describe a prior art pipeline computer with reference to FIG. 1. The system is shown as comprising a seven*stage multiplier unit 1, four-stage adder/subtractor 2 and a two-stage logic operation unit 3, and the individual stages of each of these arithmetic and logic units are pipelined to execute operands during different machine cycles. A memory access controller 4 is provided to access the main memory 5 in which coded instructions are stored. The stored instructions are retrieved from main memory 5 and supplied through an instruction buffer 5 under control of a sequence controller 7 to an instruction decoder 8, in which they are decoded to identify which one of arithmetic/logic units 1, 2 and 3 and memory access controller 4 is to be addressed. This fact is communicated from decoder 8 to a star controller 9 through path 10, and a signal indicating the amount of processing time which will possibly be taken by the identified unit or controller is supplied to a first contention check circuit 11. This check circuit collects status information on various instructions via start controller 9 and determines if there is a contention among them.

A pair of operands for each arithmetic/logic operation are supplied in parallel to each arithmetic/logic unit through operand paths 14, 15 from a register file 13 comprising general registers R1~Rn. When an arithmetic/logic operation start signal is supplied from start controller 9 to arithmetic/logic units 1, 2 and 3 at a given instant of time, the results of their operations are obtained seven, four and two machine cycle later from the given time, respectively.

Operand path 14 is further coupled to memory access controller 4 to permit it to fetch data from main memory 5.

Memory access controller 4 is provided with a cache memory. In response to a memory access instruction, controller 4 writes data into file register 13 within a period much shorter than the time taken to provide a contention check, if that data is found in the cache memory. If a cache memory miss occurs, the data not found in the cache memory is fetched from main memory 5, and hence the time taken to store it exceeds the time taken in the case of the cache memory hit, if the data fetched from the main memory were to be stored directly into register file 13, a contention may occur on write path 16. To avoid such contentions buffer registers 17-1 through 17-6 are connected to memory access controller 4 to provide a delay time which is equal to the maximum number of arithmetic/logic stages (seven in the illustrated example) minus one.

A selector 18 is responsive to a control signal supplied from a write controller 19 to select either the output of memory access controller 4 or one of the outputs of the buffer registers 17-1~17-6 for coupling to a selector 20, which in turn selects the outputs of the A/L units 1~3 or the output of the selector 18 in response to a control signal from write controller 19 for coupling to register file 13 through write path 16.

When a memory access instruction is supplied to an instruction decoder 8, a signal indicating the amount of time which will possibly be taken by memory access controller 4 (if cache memory hit occurs) is supplied to first contention check circuit 11. If no contention is detected by circuit 11, It applies a check-complete signal to start controller 9, which in turn supplies a start signal to memory access controller 4.

If a cache memory miss occurs, memory access controller 4 fetches the data from the main memory 5 and sends a fetch-complete signal to a second contention check circuit 12, to cause it to search through the status information collected by contention check circuit 11 for appropriate timing for writing the fetched data into register file 13 and notify this timing to write controller 19 to allow it to obtain the right to access register file 13. If the write timing corresponds to two machine cycles later, the output of memory access controller 4 will travel through buffer registers 17-1 and to 17-2 and proceed through the selectors 18 and 20 to register file 13. A machine cycle clock generator 21 is provided to supply clock pulses to appropriate constituent units of the system to process each instruction in a machine cycle.

The operation of FIG. 1 will be given with reference to FIG. 3A. Assume that instruction #1 is a "multiply" instruction that specifies that an arithmetic product of the contents of register R1 and R2 be stored into register R3. instruction #2 specifies that an arithmetic product of the contents of registers R4 and R5 be stored into register R6, and instruction #3 specifies that a logical product of the contents of registers R7 and R8 be stored into register R9. Instruction #4 is a memory access instruction which specifies that data M (100) be fetched from address (100) of main memory 5 and stored into register R10. Finally, instruction #5 specifies that a logical product of the contents of registers R11 and R12 be stored into register R13.

Start signals corresponding to instructions #1 and #2 are issued from start controller 9 to multiplier unit 1 during machine cycles #1 and #2 and a start signal corresponding to instruction #3 is issued to logic operation unit 3 during machine cycle #3. Because of the seven-stage multiplier unit 1, the results of the executions of instructions #1 and #2 are obtained at machine cycles #8 and #9, respectively, and because of the two-stage logic operation unit 3, the result of instruction #3 is obtained at machine cycle #5. Write controller 11 controls selector 18 to write the results of the instructions #3, #1 and #2 in the order stated into registers R9, R3 and R6, respectively.

If memory access instruction #4 is started during machine cycle #4 as indicated by a dotted line 30 in FIG. 3A, the result of the memory access execution will be obtained during machine cycle #7 if cache memory hit occurs, and a write operation is started during machine cycle #8. This write operation coincides with the write operation of instruction #1 as indicated by a dotted line 31. Even if instruction #4 is started during machine cycle #5, It will conflict with the write timing of the result of instruction #2 during machine cycle #9. To avoid such conflicts, the write operation of instruction #4 is started during machine cycle #6 as indicated by a solid line 32 by queuing the output of memory access controller 4 through buffer registers 17-1 and 17-2. In a similar manner, instruction #5 is delayed by four machine cycles from machine cycle #5 in which it would otherwise be started.

In FIG. 4A, instruction #6 is a memory access instruction that specifies that data M be fetched from from address (100) of main memory 5 and stored into register R1. Instruction #7 is a logical operation instruction specifying an arithmetic product of the contents of registers R2 and R3 be stored into register R4. Instruction #8 specifies that a logical product of the contents of register R5 and R6 be stored into register R7 and instruction #9 specifies that an arithmetic product of the contents of registers R8 and R9 be stored into register R10. Finally, instruction #10 specifies that an arithmetic product of the contents of registers R11 and R12 be stored into register R13.

If a cache memory miss occurs when instruction #6 is executed, write operation cannot be started during machine cycle #5 as indicated by a dotted line 33. If controller 4 has fetched the missing data during machine cycle #11, second contention check circuit 12 is enabled to check to see if the write path 16 is available. Since write operations for the results of multiply last instructions #9 and #10 will be performed during machine cycles #12 and #13, respectively, the write operation of the fetched data conflicts with these write operations. Contention check circuit 12 informs this fact to write controller 19 to cause it to select the output of buffer register 17-2 to write it into register R1 during machine cycle #14.

Since instruction #6 has encountered a cache memory miss, the write operation of instruction #8 encounters no conflict during machine cycle #5 as indicated by a dotted line 35 and hence, it appears that it can be started during machine cycle #3 as indicated by a dotted line 34. However, it is uncertain during machine cycle #3 whether instruction #6 will encounter a cache memory miss. Thus, a delay time corresponding to one machine cycle is introduced to the write operation of instruction #8 in order to avoid possible conflict.

Figure 2:
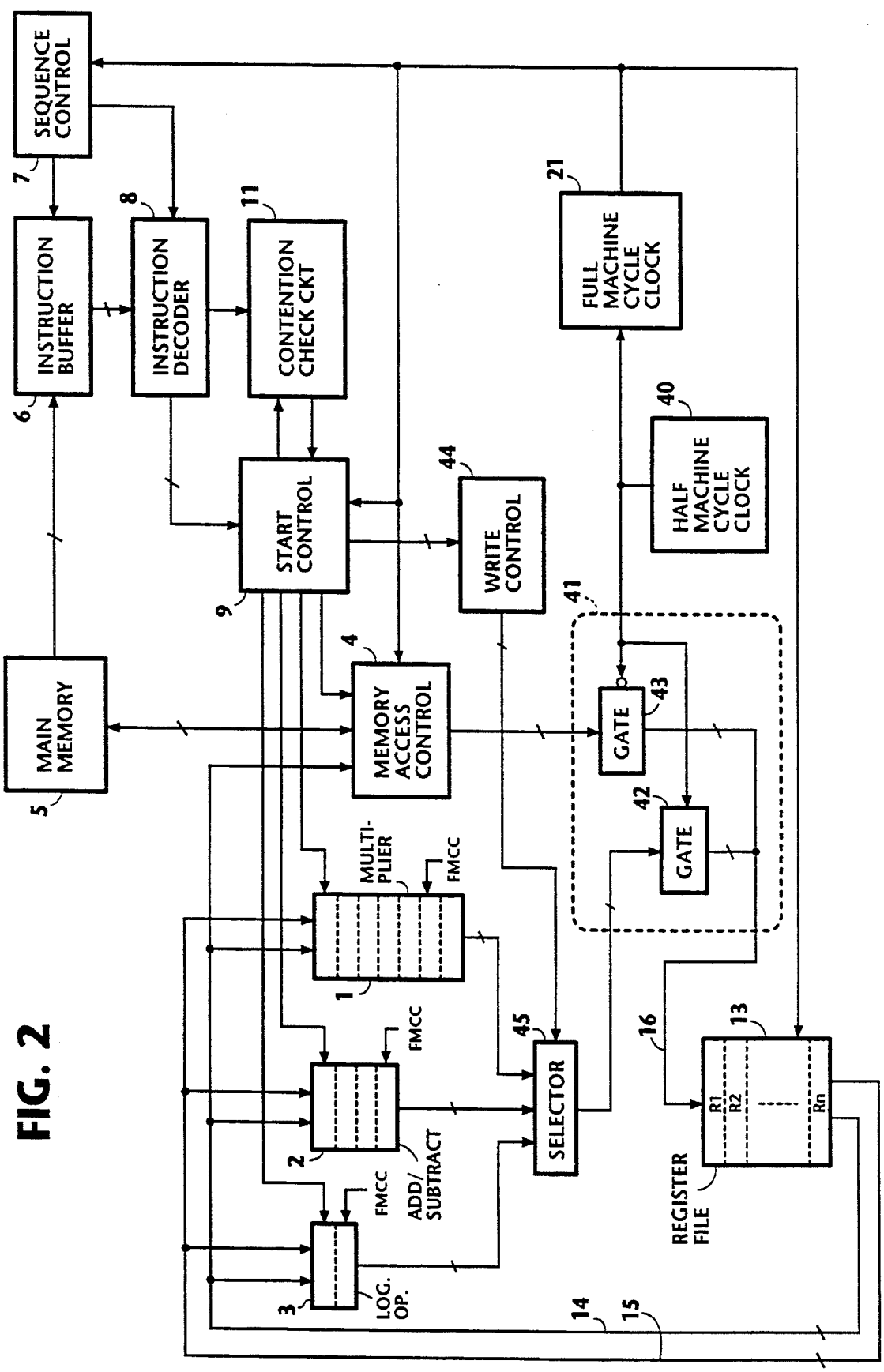
FIG. 2 is a block diagram of a pipeline data processing system according to the present invention.

A pipelined data processing system of the present invention is shown in FIG. 2 in which parts corresponding to those in FIG. 1 are marked with the same numerals as used in FIG. 1. The system of this invention differs from the prior art by the inclusion of a half-machine cycle clock generator 40 which controls a selector 41 and drives the full-machine cycle clock generator 21. Selector 41 comprises gates 42 and 43, with gate 42 having a control input connected to the half-machine clock generator 40 to open its path in response to a first half period of each full machine cycle and gate 43 having an inverted control input connected to clock generator 40 to open its path in response to the second half period of each machine cycle. A write controller 44 controls a selector 45 in response to the output of start controller 9 to select one of the A/L units 1, 2 and 3 for coupling to gate 42. The output of memory access controller 4 is connected to gate 43. The outputs of gates 42 and 43 are connected together to the input of register file 13.

If the instruction supplied to decoder 8 is an arithmetic/logic operation instruction, it feeds a signal identifying one of the A/L units to start controller 9 and a signal indicating the amount of processing time which will possibly be taken by the identified unit is supplied to contention check circuit 11. If no contention is detected, contention check circuit 11 applies a check-complete signal to start controller 9 from which a start signal is supplied to the identified arithmetic/logic unit and to the write controller 44. In response to the start signal, the write controller 44 causes selector 45 to open its appropriate gate to select the result of the arithmetic/logic operation.

If a memory access instruction is subsequently supplied to decoder 8, a signal identifying the memory access controller is applied from decoder 8 to start controller 9 from which a start signal is fed to memory access controller 4. Since the gates of selector 41 are open during mutually offset times, no conflict occurs between memory access instructions and arithmetic/logic operation instructions on the write path 16, thus eliminating the need for contention check which has been performed by the prior art system with contention check circuit 12.

Note that all data items supplied from memory access controller 4 are appended with a tag indicating their sequence in order to prevent out-of-order arrivals in register file 13 when a cache memory miss occurs.

The operation of the present invention will be best understood with reference to FIGS. 3B and 4B in which the same sets of instructions are performed as those in FIGS. 3A and 4A.

In FIG. 3B, in response to instructions #1 through #3, start controller 9 supplies two start signals to the multiply unit 1 during machine cycles #1 and #2 respectively and one start signal to logic operation unit 3 during machine cycle #1 to #3. The results of the executions of instructions #1 and #2 are obtained during machine cycles #8 and #9, and the result of instruction #3 is obtained during machine cycle #5. The write controller 44 controls the selector 45 to open its gates at the appropriate times to select the results of instructions #3, #1 and #2 during machine cycles #5, #8 and #9, respectively. Gate 42 is opened during the first half period of each machine cycle in response to the half-machine cycle clock. The results of instructions #3, #1 and #2 are therefore written into registers R3, R6 and R9 of register file 13, respectively, during the first half period of machine cycles #5, #8 and #9. On the other hand, gate 43 is opened during the second half period of each machine cycle in response to the half-machine cycle clock. The write timing (I.e., machine cycle #8) of the result of memory access instruction #4 is thus offset by one-half machine cycle with respect to the write timing of the result of A/L operation instruction #1. Therefore, the write operation of the result of memory access instruction #4 can be started during machine cycle #4, and the subsequent instruction #5 can also be started during machine cycle #5.

In FIG. 4D, assume that a cache memory miss has occurred when executing memory access instruction #6 as described in connection with FIG. 4A, and memory access controller 4 fetches the missing data from main memory 5. It is seen that the write timing of the result of memory access instruction #9 is offset by one-half machine cycle with respect to the write timing of the result of A/L operation instruction #6 by the alternate gating of selector 41. Therefore, the result of execution of instruction #6 can be written during the second-half period of machine cycle #11 and the result of execution of instruction #9 can be written during the first half period of machine cycle #11.

Although it is uncertain during machine cycle #3 whether instruction #6 will encounter a cache memory miss in machine cycle #5, the alternate gating of selector 41 allows execution of instruction #8 to be started in machine cycle #3 so that its result can be written during the first half period of machine cycle #5. Execution of instruction #10 can be started in machine cycle #5 to write its result during the first half period of machine cycle #12.

What is claimed is:

1. A data processing system comprising:

a main memory for storing data and instructions therein;

a clock source for generating half machine cycle clock pulses and full machine cycle clock pulses;

a plurality of arithmetic/logic units respectively having a different number of pipelined stages, said arithmetic/logic units executing arithmetic/logic instructions stored in said main memory in response to said full machine cycle clock pulses to generate a first type of computation data;

first selector means for selecting an output of said first type of computation data from one of said arithmetic/logic units according to said instructions being executed by said arithmetic/logic units;

a memory access controller for executing a memory access instruction stored in said main memory and reading data from said main memory to generate a second type of computation data;

second selector means having a first input terminal for receiving said first type of computation data selected by said first selector means, a second input terminal for receiving said second type of computation data from said memory access controller, and an output terminal, said second selector means being responsive to said half machine cycle clock pulses for alternately establishing a first path between said first input terminal and said output terminal and a second path between said second input terminal and said output terminal during mutually exclusive intervals; and a plurality of general registers for storing said first type of computation data and said second type of computation data selectively supplied from said output terminal of said second selector means and for supplying said first type of computation data and said second type of computation data stored in said general registers to said arithmetic/logic units as operands.

2. A data processing system as claimed in claim 1, wherein said second selector means comprises first gate means responsive to a first polarity of said half machine cycle clock pulses for establishing said first path and second gate means responsive to a second polarity of said half machine cycle clock pulses for establishing said second path.

3. A data processing system as recited in claim 1 wherein:

said first type of computation data is characterized in that arrival time of said first type of computation data to said general register occurs within a fixed determinable time following an instruction being issued to said arithmetic/logic units which results in said first type of data; and said second type of computation data is characterized in that arrival time of said second type of computation data to said general register is not determinable at an issuance of a memory access instruction which accesses said second type of computation data.

4. A data processing system comprising:

a main memory for storing data and instructions therein;

sequence control means for retrieving instructions from said main memory in sequence;

an instruction decoder for decoding said retrieved instructions;

a clock source for generating half machine cycle clock pulses and full machine cycle clock pulses;

a plurality of arithmetic/logic units respectively having a different number of pipelined stages, each of said arithmetic/logic units executing arithmetic/logic instructions retrieved from said main memory in response to said full machine cycle clock pulses and outputting a first type of computation data;

contention checking means for detecting whether there is a conflict among the retrieved arithmetic/logic instructions in said arithmetic/logic units;

a memory access controller for executing a memory access instruction stored in said main memory, said memory access controller having a cache memory for reading data from said main memory in response to a cache memory miss and reading data from said cache memory in response to a cache memory hit and for outputting said data read from said main memory and said data read from said cache memory as a second type of computation data;

start control means for activating one of said arithmetic/logic units or said memory access controller in response to an output signal from said instruction decoder if no contention is detected by said contention checking means;

first selector means for selecting one of said first type of computation data output by one of said arithmetic/logic units according to the instructions being executed by said arithmetic/logic units in response to a signal from said start control means;

second selector means having a first input terminal for receiving said first type of computation data selected by said first selector means, a second input terminal for receiving said second type of computation data from said memory access controller, and an output terminal, said second selector means being responsive to said half machine cycle clock pulses for alternately establishing a first path between said first input terminal and said output terminal and a second path between said second input terminal and said output terminal during mutually exclusive intervals; and a plurality of general registers for storing both of said first type of computation data and said second type of computation data selectively supplied from said output terminal of said second selector means and for supplying said first type of computation data and said second type of computation data stored in said general registers to said arithmetic/logic units as operands.

5. A data processing system as claimed in claim 4, wherein said second selector means comprises first gate means responsive to a first polarity of said half machine cycle clock pulses for establishing said first path and second gate means responsive to second polarity of said half machine cycle clock pulses for establishing said second path.

* * * * *